March 3, 1964  J. F. KOPCZYNSKI  3,122,932
MACHINE TOOL

Filed Aug. 17, 1960  5 Sheets-Sheet 1

INVENTOR.
John Kopczynski
BY
Popp and Sommer
Attorneys

INVENTOR.
John Kopczynski
BY
Popp and Sommer
Attorneys

March 3, 1964 J. F. KOPCZYNSKI 3,122,932
MACHINE TOOL
Filed Aug. 17, 1960 5 Sheets-Sheet 3

INVENTOR.
John Kopczynski
BY
Popp and Sommer
attorneys

March 3, 1964 J. F. KOPCZYNSKI 3,122,932
MACHINE TOOL
Filed Aug. 17, 1960 5 Sheets-Sheet 4
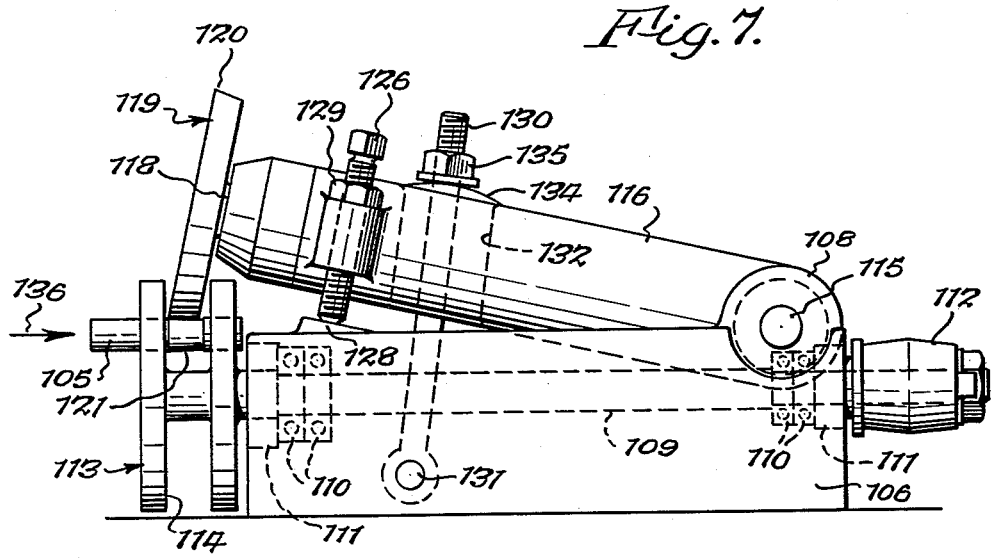
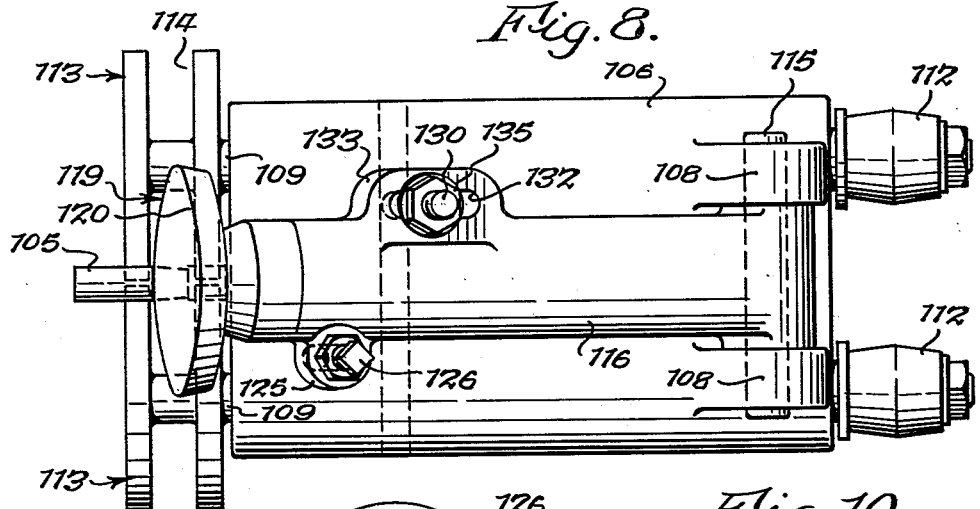
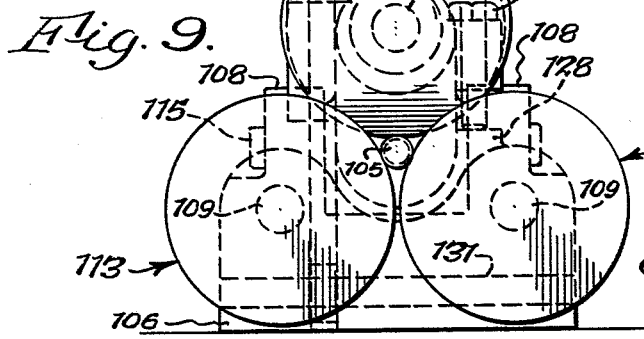
INVENTOR.
John Kopczynski
BY
Popp and Sommer
Attorneys

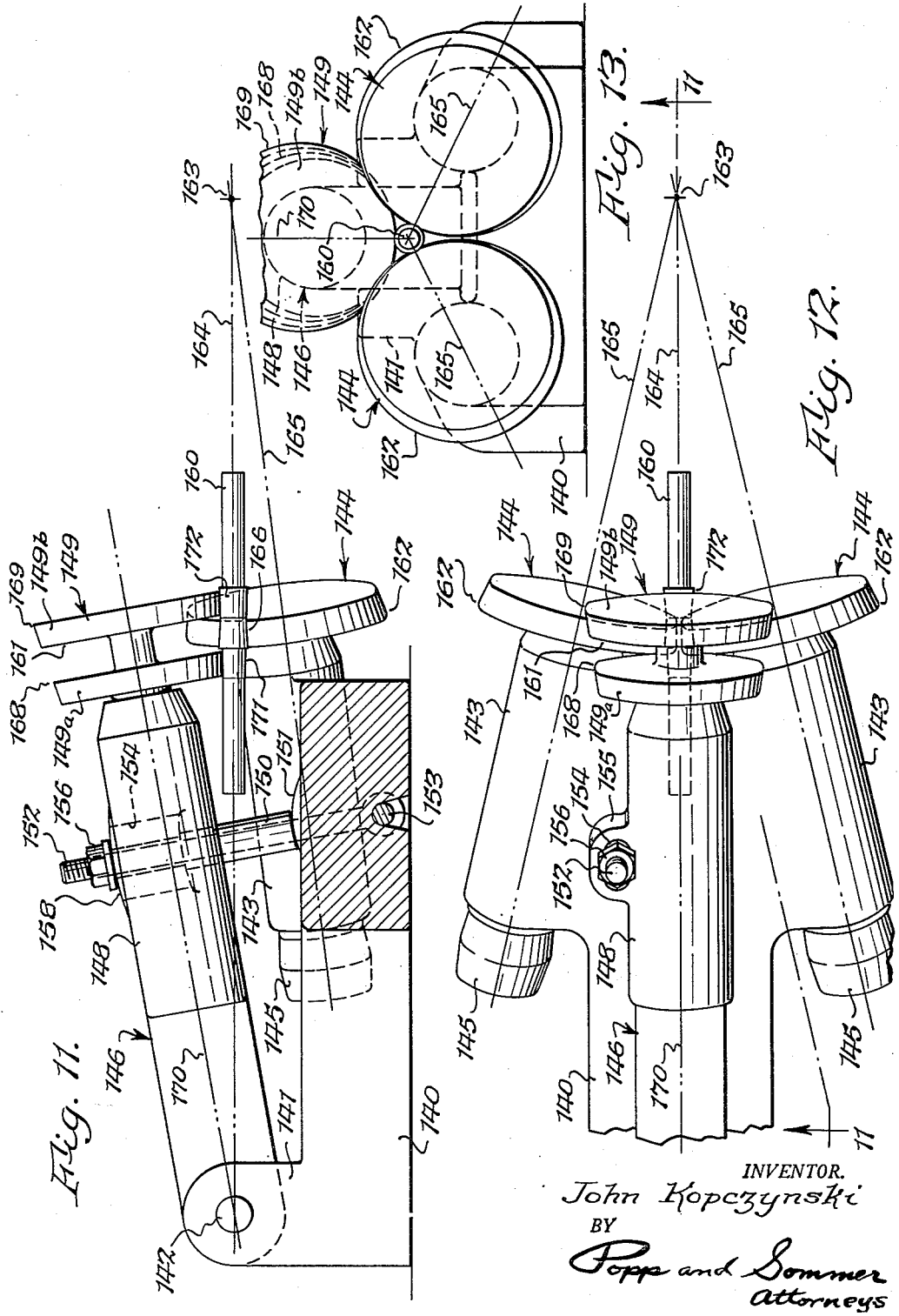

United States Patent Office 3,122,932
Patented Mar. 3, 1964

3,122,932
MACHINE TOOL
John F. Kopczynski, 1671 Sweeney,
North Tonawanda, N.Y.
Filed Aug. 17, 1960, Ser. No. 50,224
11 Claims. (Cl. 74—209)

This invention relates to machine tools, and more particularly to those which are used to center, hold and rotate at high speed a driven member which can be the object to be operated upon, or which can be a tool, or the holder for a tool, such as a grinding wheel.

In common with other machine tools of this type, general objects of the invention are to provide an improved and simplified device for centering and rotating a driven member; from which the driven member can be quickly and easily removed from held position or a new driven member inserted in operative position where it is centered and held for rotation; which will be exceptionally simple and compact in construction; which will center, hold and rotate a driven member of very small diameter at high speed with minimum frictional resistance; which adjusts automatically to receive and hold driven members of different diameters to be centered and rotated; which accurately rotates the driven member concentric with its periphery; with which a uniform and continuous holding pressure can be exerted on the held driven member; and which requires only simple operations in its use.

A specific object of the present invention is to provide a simple and effective arrangement for holding the driven member against axial displacement in the machine tool.

Another specific object is to provide such an arrangement which involves at most line contact between the parts so holding the driven member against axial displacement thereby to reduce friction and resistance to a minimum.

Another object is to provide such an arrangement which is exceptionally powerful in holding the driven part against axial displacement in one direction.

Another specific object is to provide such an arrangement which is expectionally powerful in holding the driven part against axial displacement in both directions.

Another specific object is to provide simple and effective spring mounting for one of the three wheels of the machine tool and which biases its wheel against the driven member carried by the peripheries of the three wheels.

Another specific object is to provide high speed bearings for the wheels of such a tool which insure rapid distribution of the oil on starting thereby to render the tool capable of being put in action more rapidly with reduced starting friction and torque.

Another specific object is to provide such a bearing which has improved oil circulation in operation.

Other objects and advantages of the invention will be apparent from the following description and drawings in which:

FIG. 7 is a side elevational view of a form of the invention designed to resist axial forces in one direction against the driven member.

FIG. 8 is a top plan view of the form of the invention shown in FIG. 7.

FIG. 9 is a front elevational view thereof.

FIG. 10 is a side elevational view of the driven member used in the form of the invention shown in FIGS. 7–9.

FIG. 11 is a vertical section taken generally on line 11—11, FIG. 12, and illustrating a further modification of the invention which is constructed to resist heavy axial forces against the driven member in both directions.

FIG. 12 is a top plan view of the form of the invention shown in FIG. 11.

FIG. 13 is a fragmentary front elevational view thereof.

Figure 1:
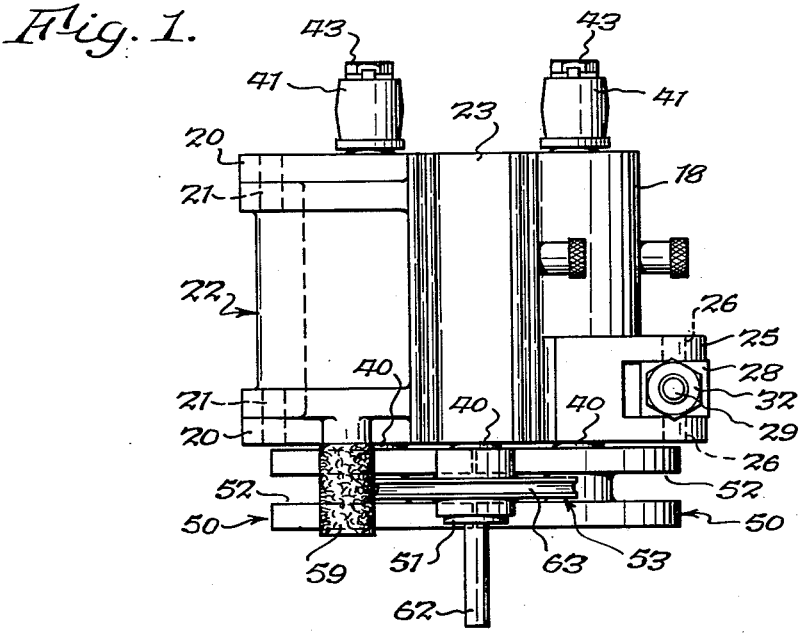
FIG. 1 is a top plan view of a machine tool embodying the present invention.
Figure 2:
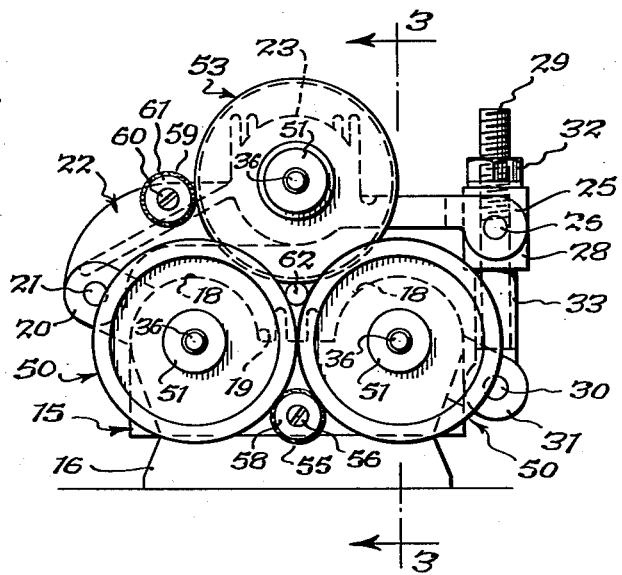
FIG. 2 is a front elevational view thereof.

In the embodiment of the invention shown in FIGS. 1–3 and 3a, the frame 15 of the machine tool is shown as mounted on a base 16 and as being in the form of a block of metal having upstanding semicylindrical fore-and-aft side portions 18 forming a fore-and-aft valley 19 therebetween. Ears 20 project laterally from the ends of one of these semicylindrical portions 18 and support the pivot pins 21 of an arm 22 which extends transversely over the frame 15. The axis of the pivot pins 21 is parallel with the axes of the semicylindrical side portions 18 of the frame and the outboard end of the arm 22 is in the form of a cylindrical enlargement 23 the axis of which is also parallel with the axes of the semicylindrical side portions 18 and which is arranged above the valley 19.

The arm 22 is provided with an integral bifurcated ear 25 projecting from its outboard extremity and carrying horizontal fore-and-aft pins 26 which support a square block 28 having a vertical bore through which an eye-bolt 29 projects.

The head of this eye-bolt is journalled on a pin 30 carried by ears 31 projecting laterally outwardly from the corresponding side of the frame 15 and a nut 32 is provided at the upstanding end of the eye-bolt 29 above the square block 28 to provide a releasable holddown for the arm 22. Preferably a spacing sleeve 33 around the eye-bolt 29 is interposed between its eye and the end of the block 28 to provide an exact gage for the position of the arm 22.

The cylindrical enlargement 23 at the outboard end of the arm 22 and also each semicylindrical side portion 18 of the frame 15 is provided with a coaxial through bore 35. In each of these through bores is journalled a spindle 36 by means of ball bearings 38 at the ends of the bores. The ends of the bores are closed by threaded end heads or rings 39 having bores through which the ends of the spindle project outwardly from the bore, the front end of each spindle being in the form of a conical or tapered head 40 and the rear end of each spindle carrying a drive pulley 41 fixed thereon by means of a spline 42 and end nut 43 screwed on the threaded rear extremity of each spindle.

A quantity of oil is contained in each bore 35 and a feature of the invention resides in the rapid distribution of this body of oil to the ball bearings 38 on starting so as to reduce starting torque and friction and hence permit more rapid starting. To this end a sleeve 44 is mounted on each spindle between its ball bearings 38 to rotate with the spindle and is provided with an axially spaced series of annular radially outwardly projecting fins 45 which serve as oil slingers and can be provided with flats 46 at their peripheries. These peripheries are arranged in closely spaced relation to the bores 35 so as to maintain a rotating layer of oil around each bore. Thus these bearings rotate at high speed and the oil contained in the air in the form of mist or droplets is driven centrifugally by rapid rotation of the air and hence deposited on the wall of the bore 35. Through this tendency to maintain a layer of oil on the wall of bore 35 by the fins 45, churning of the oil is reduced.

A wheel 50 having a deeply grooved periphery is fixed to the conical or tapered end head 40 of each of the lower two spindles 36 as by a nut 51 screwed on the threaded outboard end of each tapered end head 40. The peripheral groove of each wheel is indicated at 52 and these grooves extend to the hubs of the wheels and are in alinement with each other to jointly receive the periphery of a wheel 53 fixed to the tapered end head 40 of the top spindle 36 carried by the arm 22. This wheel 53 can be secured to its spindle by a nut 51 in the same manner as with the other wheels 50.

The peripheries of the wheels 50 can be oiled by a cylindrical oil saturated felt body 55 fixed by a screw 56 and washer 58 to the frame 15 in position to contact the peripheries of both of these wheels 50 and capable of being turned, upon loosening the screw 56, to present fresh portions of the felt body for services as wear takes place. The periphery of the wheel 53 can be oiled by a similar cylindrical oil saturated felt body 59 secured to the arm 22 by a screw 60 and washer 61 in position to contact the periphery of the wheel 53.

Figure 3:
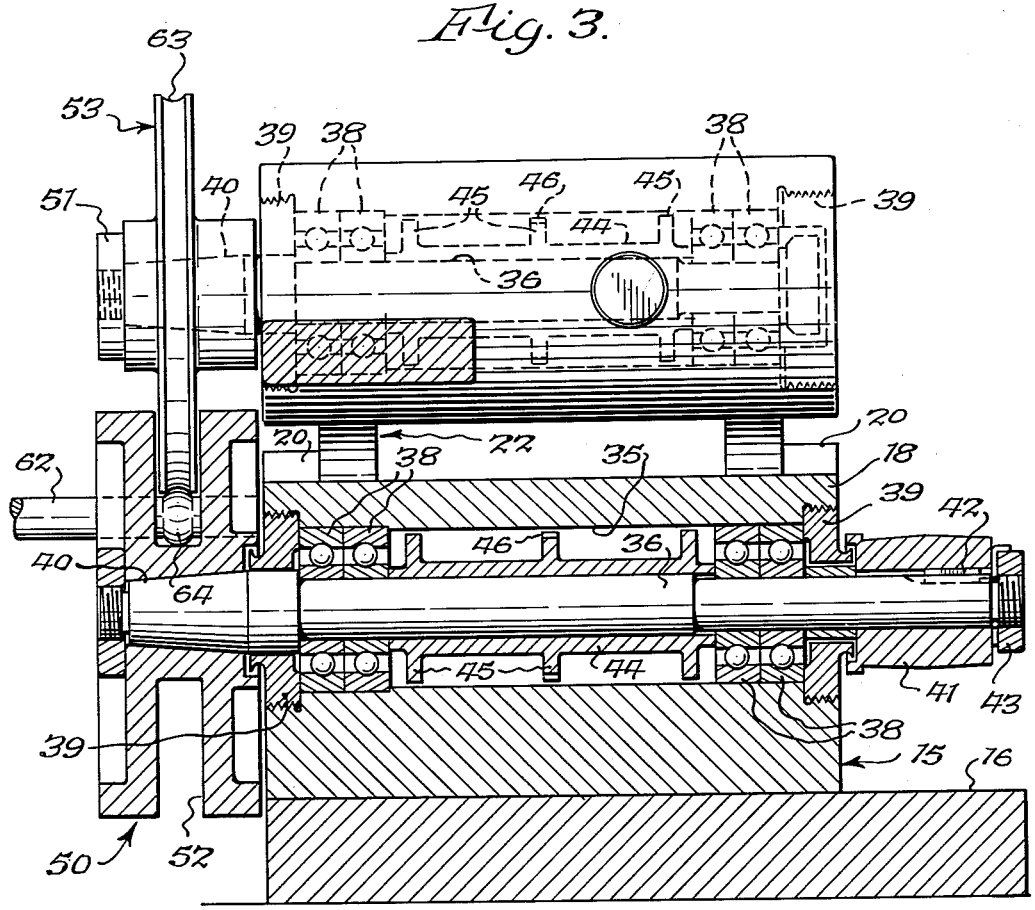
FIG. 3 is an enlarged vertical section taken generally on line 3—3, FIG. 2.
Figure 3A:
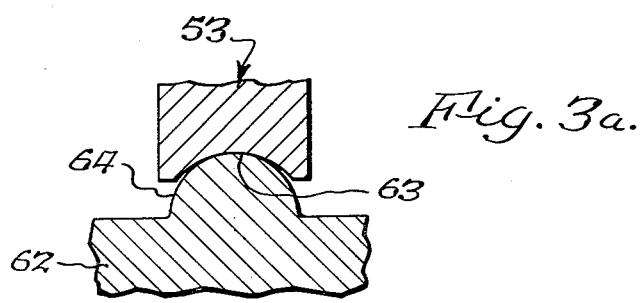
FIG. 3a is a further enlarged fragmentary view similar to FIG. 3 and showing the manner in which point contact is obtained between the driving and the driven parts of the machine tool.

These oiled peripheries jointly support and rotate a driven member 62 which can be a holder for the workpiece, a holder for a tool to be rotated at high speed, or could be the workpiece or tool itself. A feature of the present invention resides in the form of this driven member in relation to the periphery of one of the wheels to hold the driven member against axial displacement with reference to the wheels. To this end the wheel 53 is provided with a concentric groove 63 which is shown as being of circular form in cross section. The driven member 62 is provided with an annular bead, rib or protuberance 64 which is also of circular form in cross section but on a smaller radius than the groove 63, as illustrated in FIG. 3a so as to have point, that is, less than line contact with the wheel 53 and hence minimum friction in the rolling contact.

It is believed that the operation of the tool will be understood from the foregoing description, but will be briefly summarized. With the parts in the position described, and with the power applied to the pulleys 41 to rotate the spindles 36 and deeply grooved wheels 50 in the same angular direction, the driven member 62 will be rotated at a very high rate of speed by virtue of its being of small diameter and being held in contact with the much larger peripheries of these wheels 50 by the larger diameter third wheel 53. While the invention is not limited to the wheels interleaving, this interleaving permits the use of wheels having larger diameters and jointly supporting a very small diameter driven member so as to obtain a very high rate of speed. At the same time the driven member 62 is held against axial movement by reason of its annular radial enlargement or protuberance 64 riding in centered relation in the groove 63 of the holddown wheel 53. While the shape of this annular protuberance 64 and grooves 63 holds the protuberance in centered relation to the grooves and thereby holds the driven member 62 against axial displacement, there is less than line contact, actually only point contact between these parts as illustrated in FIG. 3a to reduce friction and starting torque to a minimum. By holding the driven member 62 against axial displacement it can be used where axial thrust forces are involved.

It will also be noted that by virtue of the fins 45 on the spindles 36, on starting the machine the bodies of oil in the bores 35 are rapidly distributed to the bearings 38 thereby to permit quicker starts through the reduction of starting friction and torque. These also set up rapid rotation of the body of air in each bore to drive the oil droplets or mist centrifugally into contact with each bore to reduce churning of the oil.

Figure 4:
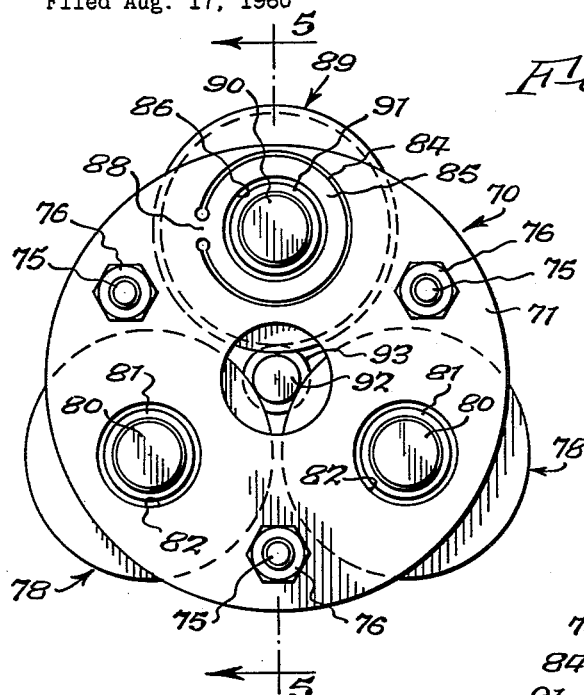
FIG. 4 is a front elevational view of a modified form of the invention.
Figure 5:
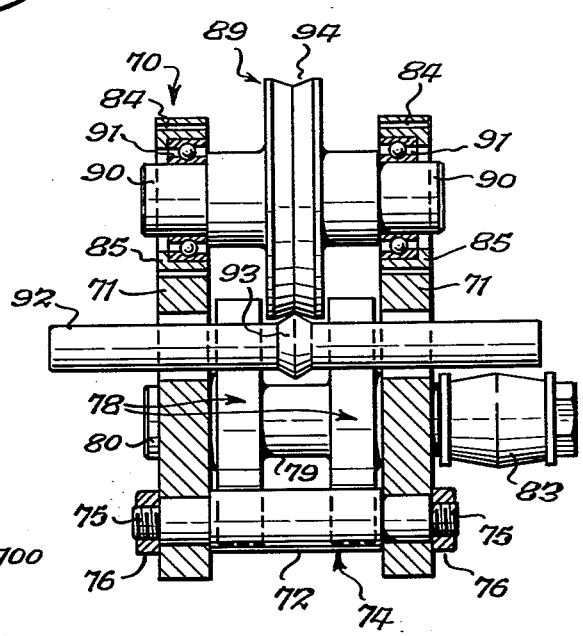
FIG. 5 is a vertical section taken generally on line 5—5, FIG. 4.

In the form of the invention shown in FIGS. 4 and 5 the frame 70 of the machine tool is shown as comprising two circular metal end plates 71 each having a central hole therethrough and held in spaced relation by the enlarged body portions 72 of tie bolts 74 having threaded ends 75 projecting through the end plates and carrying nuts 76 which secure the side plates to the bolts.

A pair of lower wheels 78 each having deep peripheral grooves 79 are arranged between the lower parts of the end plates 71 in horizontally spaced relation with their grooves 79 in alinement with each other. The shafts 80 of these wheels extend through bearings 81 in holes 82 through the end plates and drive pulleys 83 are shown as fixed to the rear ends of these shafts.

Above and in centered relation to the wheels 78 the end plates 71 are provided with C-shaped slots 84 extending therethrough and in register with each other. Each of these C-shaped slots 84 provides a ring 85 having a through bore 86 and connected at one side to the end plate 71 by a bridge 88 which provides a spring member. Each ring 85 and its spring mounting is thereby integral with the corresponding end plate 71. The spring mounting 88 is designed to permit vertical movement of its ring 85 and therefore is preferably located in a horizontal plane intersecting the axis of the ring and this plane being at right angles to the direction of spring pressure to be applied.

These spring supported rings 85 journal a third wheel 89 which is narrow enough to fit in the peripheral grooves 79 of the other two wheels 78 without contact with the walls thereof. The opposite shaft ends 90 of the wheel 89 are journalled in roller bearings 91 mounted in the spring supported rings 85. As with the form of the invention shown in FIGS. 1–3 the driven member 92 is provided with an annular protuberance 93 but this is shown as being V-shaped rather than round in cross section. The wheel 89 is shown as provided with a V-shaped peripheral groove 94 the sides of which are at a greater angle than the sides of the protuberance 93 so as to provide less than line contact, that is, point contact, between these parts with consequent reduced friction.

It will be seen that the operation of this form of the invention is the same as that just described except that the wheel 89 is yieldingly biased into contact with the driven member 92 so that this driven member is yieldingly clasped by the three wheels. Such yielding clasping insures proper contact pressures at all time and under changing working conditions.

Figure 6:
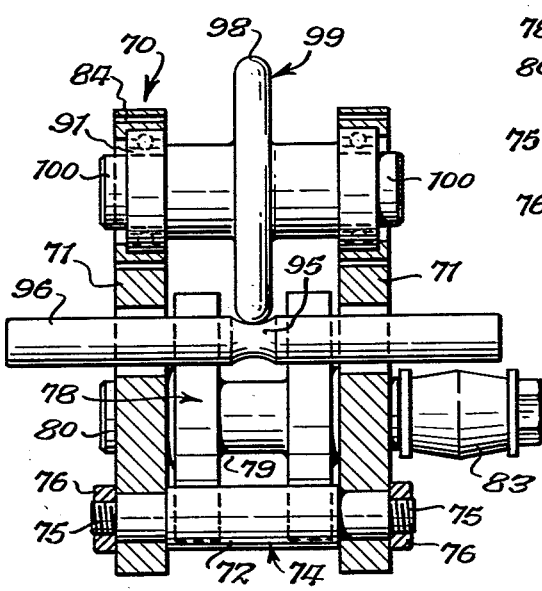
FIG. 6 is a view similar to FIG. 5 showing a further modified form of the invention.

The form of the invention shown in FIG. 6 is identical to that shown in FIGS. 4 and 5 except that the groove 95 is provided in the driven member 96 and the annular protuberance or rib 98 is provided on the wheel 99, the shaft of which is designated at 100. Since in other respects this form of the invention is identical with FIGS. 4 and 5 the same reference numerals have been employed and the description will not be repeated, it being noted that the groove 95 has a greater radius than the rib or annular protuberance 98 on the wheel 99 so as to provide point contact between these parts.

The form of the invention illustrated in FIGS. 7–10 is constructed to resist exceptionally heavy end thrust forces against the driven member 105 illustrated in FIG. 10. To this end the machine tool comprises a frame 106 in the form of a metal base having a pair of transversely spaced ears 108 rising from the rear end thereof. In this frame 106 are journalled a pair of transversely spaced spindles 109, these being arranged in the same horizontal plane. These spindles can be mounted in the same manner as the spindles 36 in the form of the invention shown in FIGS. 1–3, the ball bearings being indicated at 110 and the threaded retaining end heads being indicated at 111. Drive pulleys 112 are fixed to the rear ends of these spindles and wheels 113 having deep peripheral grooves 114 are fixed to the front ends of these spindles, the grooves 114 of the two wheels being alined with each other as best shown in FIG. 8.

The ears 108 carry a horizontal cross pin 115 which journals a tubular arm 116, extending upwardly in centered relation to the two wheels 113. This arm 116 is preferably of tubular form and it journals the spindle or shaft 118 of a third wheel 119. This third wheel has an annular rib or protuberance 120 of conical form in cross section, the conical periphery of this wheel preferably converging into centered relation with the axis of the pin 115. As with the other forms of the invention a complementary groove 121 is provided which mates with the annular protuberance 120 and since this protuberance is on the wheel 119 the groove 121 is in the driven member 105, this mating groove is therefore also of conical or tapered form, diminishing so that a projection of its conic section would meet at a point on the axis of the cross pin 115. An abrupt shoulder 122 terminates the deep end of the groove 121.

In order to permit of adjustment of the wheel 119 into proper contact with the driven member 105 the arm 116 is provided at one side with a laterally projecting ear 125 in which is screwed a generally vertical set screw 126, the bottom of the set screw resting upon a stop or abutment 128 on the base and its adjusted position being held by a lock nut 129.

To hold the wheel 119 against upward displacement, an eyebolt 130 is swingably mounted on a horizontal cross pin 131 and has its upper threaded end projecting through a fore-and-aft slot 132 in another ear 133 projecting horizontally from the arm 116. The upper surface 134 of this ear is preferably rounded concentric with the pin 131 and a nut 135 on the upper end of the screw 130 engages the surface 134 to hold the arm 116 and its wheel 119 down against the driven member.

It will be seen that the operation of the form of the invention shown in FIGS. 7-10 is the same as that previously described except that by the provision of a single conical protuberance on the wheel 119 and the complementary conical groove 121 in the driven member 105, both in line with the axis of the pin 115, line contact is established lengthwise of the axis of these parts and a great deal more resistance is provided against axial thrust on the driven member 105 in one direction, this being toward the right as viewed in FIGS. 7 and 8 as indicated by the arrow 136. Accordingly, this permits the machine tool to be used where heavy end thrusts in one direction are encountered such as with drilling. It will be noted that as with the forms of the invention previously described at most line contact exists between the driven part and one of the wheels to resist axial thrust forces.

The form of the invention shown in FIGS. 11 and 13 is constructed to resist heavy axial thrusts against the driven part from both directions.

The frame of the tool is shown as being in the form of a metal base 140 which is formed at its rear end to provide an upstanding ear 141 carrying a horizontal transverse pivot pin 142. The forward end of the base is formed to provide tubular, cylindrical side portions 143 in each of which is concentrically journalled the spindle (not shown) for a wheel 144 fast to the spindle in front of the corresponding cylindrical side portion 143. The spindle can be of the form shown in FIG. 3 with a drive pulley 145 fixed to its rear end and through it the wheels 144 are driven.

Journalled on the pin 142 and projecting forwardly over the frame 140 is an arm 146 including a cylindrical forward portion 148 in which is journalled the spindle (not shown) for a third wheel 149. This arm 146 is shown as having a downwardly projecting stop sleeve 150 resting on a seat 151 on the base and the arm is shown as being held down by an eye bolt 152 in the stop sleeve swingably mounted at a horizontal cross pin 153 of the base and extending through a slot 154 in an ear 155 projecting laterally from the arm 146. The threaded upper end of the eye bolt is provided with a nut 156 which bears downwardly against the round upper surface 158 of the ear 155 to hold the wheel 149 down against the driven member 160.

The wheel 149 is provided with a deep central annular groove 161 which contains the peripheries of the other two wheels 144 and which rotate out of contact with the walls of this groove. Each of the two wheels 144 has a radially projecting annular protuberance or rib 162 which is of conical form, a projection of the conical surfaces of each protuberance 162 converging on a point 163 on the axis 164 of the driven member 160 as indicated by the projection lines 165. This conical protuberance 162 of each wheel 144 mates with a conical groove 166 in the driven member, a projection of the conical surface of which thereby also converges on the point 163 and the engagement of the conical surfaces 162, 166 serving to resist axial displacement of the driven member 160 to the right as viewed in FIGS. 11 and 12.

The central groove 161 divides the third wheel 149 into two parts 149a and 149b. The periphery of the inner rear part 149a has an annular radially projecting rib or protuberance 168 of conical form. The periphery of the outer or front part 149b has an annular radially projecting rib or protuberance 169 also of conical form. The surfaces of the protuberances 168 and 169 are in convergent alinement with each other and a projection, indicated by the line 170, of these surfaces converge upon the cross point of the axis of the cross pin 142 and the wheel 149. The protuberances 149a, 149b respectively engage and mate with conical grooves 171 and 172 in the driven member 160. It will be seen that this engagement resists axial movement of this driven member to the left as viewed in FIGS. 11 and 12. It will also be noted that the axes 165 and 170 of the wheels 144 and 149 extend in the same general direction as do the axes of the corresponding wheels in the other forms of the invention illustrated.

From the foregoing it will be seen that the various forms of the machine tool as above described achieve the objects and have the advantages set forth.

I claim:

1. A machine tool, comprising a frame, three wheels journalled on said frame in triangular relation to one another with their axes extending in the same general direction, and with their peripheries substantially equidistant from a common axis, a driven member rotatable about said common axis and having its periphery provided with surface means rigidly fixed thereto which converges with reference to its axis, and the periphery of one of said wheels being provided with surface means rigidly fixed thereto which converges with reference to its axis and mates with said peripheral surface means rigidly fixed to said driven member, said mating rigidly fixed surface means forming the sole means holding said driven member against axial and radial displacement with reference to said one of said wheels.

2. A machine tool as set forth in claim 1 wherein said surface means are shaped to have no greater than line contact with each other.

3. A machine tool as set forth in claim 1 wherein said surface means are shaped to have point contact with each other.

4. A machine tool comprising a frame, three wheels journalled on said frame in triangular relation to one another with their axes in converging relation to one another, and with said peripheries substantially equidistant from a common axis, a driven member rotatable about said common axis and having a periphery in contact with said peripheries of said wheels, said periphery of said driven member and the periphery of one of said wheels being severally provided with mating circumferential surfaces which converge with reference to their axes to hold said driven member against axial displacement with reference to said one of said wheels, said mating circumferential surfaces being of conical form concentric with said common axis and have line contact with each other lengthwise of said common axis.

5. A machine tool, comprising a frame, a pair of wheels journalled on said frame with their axes extending in the same general direction and each having a grooved periphery with the grooves of the two wheels alined side-by-side with each other, a third wheel journalled on said frame with its axis extending in the same general direction as said axes of said grooved wheels and with its periphery of a size capable of entering said grooves of said grooved wheels without contact therewith, a driven member having its periphery in contact with said peripheries of all three of said wheels, said periphery of said third wheel and said periphery of said driven member being severally provided with mating circumferential surfaces which converge with reference to their axes to hold said driven member against axial and radial displacement with reference to said third wheel.

6. A machine tool as set forth in claim 5 wherein said circumferential surfaces are shaped to have no greater than line contact with each other.

7. A machine tool comprising a frame, a pair of wheels journalled on said frame with their axes in converging relation to one another and each having a grooved periphery with the grooves of the two wheels alined side-by-side with respect to each other, a third wheel journalled on said frame with its axis extending in converging relation to the converging axes of said grooved wheels and with its periphery of a size capable of entering said grooves of said grooved wheels without contact therewith, a driven member having its periphery in contact with said peripheries of all three wheels, said peripheries of said third wheel and said periphery of said drive member being severally provided with mating circumferential surfaces of conical form concentric with the axis of said driven member and having line contact with each other lengthwise of said axis of said driven member to hold said driven member against axial displacement with reference to said third wheel.

8. A machine tool, comprising a frame, a pair of wheels journalled on said frame with their axes extending in the same general direction and each having a grooved periphery with the grooves of the two wheels alined side-by-side with each other, a third wheel journalled on said frame with its axis extending in the same general direction as said axes of said grooved wheels and with its periphery of a size capable of entering said grooves of said grooved wheels without contact therewith, a driven member having its periphery in contact with said peripheries of all three said wheels, said periphery of said third wheel and said driven member being provided with mating conical surfaces converging toward the axis of rotation of said driven member and having line contact with each other lengthwise of the axis of said driven member.

9. A machine tool, comprising a frame, a pair of wheels journalled on said frame with their axes extending in the same general direction and each having a grooved periphery with the grooves of the two wheels alined side-by-side with each other, a third wheel journalled on said frame with its axis extending in the same general direction as said axes of said grooved wheels and with its periphery of a size capable of entering said grooves of said grooved wheels without contact therewith, a driven member having its periphery in contact with said peripheries of all three of said wheels, said periphery of one of said wheels and said driven member being provided with a first pair of mating conical surfaces converging in one direction toward the axis of rotation of said driven member and having line contact with each other, and said periphery of another of said wheels and said driven member being provided with additional pair of mating conical surfaces having line contact with each other converging toward the axis of rotation of said driven member in the opposite direction from said first pair of mating conical surfaces.

10. A machine tool, comprising a frame, a pair of wheels journalled on said frame with their axes spaced from each other and extending in the same general direction and with their peripheries in closely spaced relation to each other, an arm journalled at one end on said frame to swing about an axis which extends transversely of and in a plane extending in the same general direction and substantially midway between said first mentioned axes, a third wheel journalled on said arm with its axes extending in the same general direction as said first mentioned axes and substantially intersecting said axis of swing of said arm, a driven member having its periphery in contact with the peripheries of all three of said wheels, said periphery of said driven member and the periphery of one of said wheels being severally provided with mating surfaces holding said driven member against axial displacement with reference to said one of said wheels.

11. A machine tool, comprising a frame, three wheels journalled on said frame in triangular relation to one another with their axes extending in the same general direction, and with their peripheries substantially equidistant from a common axis, a driven member rotatable about said common axis, means providing a peripheral surface on one of said wheels which converges gradually with reference to its axis, and means providing a peripheral surface on said driven member which converges gradually with reference to its axis, said peripheral surfaces mating with each other and being shaped to have no greater than line contact with each other and to have the peripheral speed of one mating surface equal to the peripheral speed of the other mating surface throughout the full mating extent thereof, thereby to avoid friction due to portions of said mating surfaces traveling at different peripheral speeds, said mating surfaces holding said driven member against the peripheries of the other two of said wheels.

References Cited in the file of this patent
UNITED STATES PATENTS

| | | |
|---|---|---|
| 1,737,997 | Garrard | Dec. 3, 1929 |
| 2,737,821 | Papp | Mar. 13, 1956 |
| 2,741,074 | Kopczynski | Apr. 10, 1956 |
| 2,814,206 | Kopczynski | Nov. 26, 1957 |
| 2,850,338 | Kopczynski | Sept. 2, 1958 |
| 2,933,355 | Roesch | Apr. 19, 1960 |
| 2,937,059 | Anderson et al. | May 17, 1960 |
| 2,959,457 | Szymalak | Nov. 8, 1960 |
| 2,968,136 | Behlen | Jan. 17, 1961 |